United States Patent
Olijnyk et al.

(10) Patent No.: US 7,541,706 B2
(45) Date of Patent: Jun. 2, 2009

(54) ELECTRICAL CONNECTOR FOR A SMALL ELECTRIC MOTOR

(75) Inventors: Mark Leonid Olijnyk, Hallet Cove (AU); Daniel Joseph Flynn, Morphett Vale (AU)

(73) Assignee: Visiocorp Patents S.a.r.l., Luxembourg (LU)

( * ) Notice: Subject to any disclaimer, the term of this patent is extended or adjusted under 35 U.S.C. 154(b) by 367 days.

(21) Appl. No.: 10/588,096

(22) PCT Filed: Jan. 28, 2005

(86) PCT No.: PCT/AU2005/000089

§ 371 (c)(1),
(2), (4) Date: Jul. 28, 2006

(87) PCT Pub. No.: WO2005/074102

PCT Pub. Date: Aug. 11, 2005

(65) Prior Publication Data

US 2007/0194646 A1    Aug. 23, 2007

(30) Foreign Application Priority Data

Jan. 28, 2004   (AU)   ............................... 2004900349

(51) Int. Cl.
*H02K 5/22* (2006.01)
(52) U.S. Cl. ............................. 310/71; 310/89; 439/357
(58) Field of Classification Search .................. 310/71, 310/89; 439/357–358
See application file for complete search history.

(56) References Cited

U.S. PATENT DOCUMENTS

| | | | |
|---|---|---|---|
| 4,127,785 A | * | 11/1978 | Noguchi ...................... 310/89 |
| 4,429,243 A | * | 1/1984 | Crow .......................... 310/71 |
| 4,656,378 A | * | 4/1987 | Atherton et al. ............... 310/71 |
| 4,690,366 A | * | 9/1987 | Loup .......................... 248/676 |
| 4,851,725 A | * | 7/1989 | Keck .......................... 310/71 |
| 4,933,582 A | * | 6/1990 | Hata et al. ............. 310/154.14 |
| 5,015,894 A | * | 5/1991 | Crow et al. .................... 310/71 |
| 5,204,565 A | * | 4/1993 | Sekine et al. ................. 310/71 |
| 5,659,213 A | * | 8/1997 | Imashiro et al. ............... 310/71 |
| 5,718,596 A | * | 2/1998 | Inaba et al. .................. 439/352 |
| 5,861,689 A | * | 1/1999 | Snider et al. .................. 310/71 |
| 6,107,713 A | * | 8/2000 | Hulsmann et al. ......... 310/75 R |

(Continued)

FOREIGN PATENT DOCUMENTS

DE    40 00 861 A1    7/1991

(Continued)

*Primary Examiner*—Burton Mullins
(74) *Attorney, Agent, or Firm*—Reising Ethington P.C.

(57) ABSTRACT

A electric motor and motor housing assembly includes an electric motor body having spaced apart sockets for receiving and frictionally engaging spaced apart electrical power supply terminals. A housing supports the motor. The housing defines an aperture over the sockets. The assembly also includes a connector body. A pair of spaced apart electrical terminals extends outwards from the connector body and is receivable by the sockets. A motor body gripping portion extends from the connector body. The gripping portion mechanically latches to the motor body thereby substantially preventing relative movement between the terminals and the sockets. A pliable member is mounted between the connector body and the housing. The pliable member allows relative movement between the connector body and the housing while the motor moves relative to the housing under varying loads.

2 Claims, 7 Drawing Sheets

U.S. PATENT DOCUMENTS

| | | | | |
|---|---|---|---|---|
| 6,140,722 A | * | 10/2000 | Ballard et al. | 310/68 D |
| 6,394,191 B1 | | 5/2002 | Nakane | |
| 2001/0006312 A1 | * | 7/2001 | Sheeran et al. | 310/71 |
| 2005/0040715 A1 | * | 2/2005 | Nesic | 310/71 |

FOREIGN PATENT DOCUMENTS

| | | |
|---|---|---|
| GB | 2 030 377 A | 4/1980 |
| JP | 1 024 36 02 A | 1/1998 |

\* cited by examiner

ELECTRICAL CONNECTOR FOR A SMALL ELECTRIC MOTOR

BACKGROUND ART

1. Field of the Invention

The present invention relates to small electric motors and connectors therefor. In particular, the present invention relates to small electric motors and gear train assemblies housed in moulded plastic and connectors therefor.

2. Background to the Invention

Small electric motors are used in a wide variety of applications. For instance, small DC electric motors are used in toys, power tools and motor vehicles. In many high volume applications, moulded plastic or die cast metal parts are used to house small electric motors and associated gear trains. In such applications, the moulded plastic or die cast metal components are usually designed to allow the motor some freedom of movement with respect to its housing. This is done so that the bearings within the motor and elsewhere in the drive train are not excessively loaded due to a lack of precision in the manufacture of such high volume components. Put another way, with moulded plastics, it is difficult to achieve the manufacturing tolerances normally required for gear trains and their bearings and, therefore, a common design solution is to allow the motor to be free to move to a small extent in relation to its housing. A problem with this design approach arises in relation to the electrical connection to the motor.

One example of a small electric motor and gear train assembly can be found in automotive side or "wing" mirror assemblies. Electric motors are used to adjust the angle of the rear vision mirror with respect to the driver and are also used to park the mirror head with respect to the vehicle. In larger vehicle side mirrors, power telescoping mechanisms may be employed in which a small DC electric motor is used to drive a mirror head out from the side of the vehicle. In all of these applications, small DC electric motors are typically employed that have two slots for receiving electrical connectors. These "female" connector terminals on the motors themselves provide for easy assembly. For instance, "male" terminals can be arranged to protrude from a housing for supporting the motor so that when a motor is installed into the housing, the male connectors protrude into the female connector slots to provide electrical connection to the motor. A problem with this approach is that small movements of the motor in use (relative to its surrounding housing) can lead to fretting of the electrical connection and/or back out of the connector from the motor.

It is an object of the present invention to provide an improved connector to a small electric motor.

SUMMARY OF THE INVENTION

According to a first aspect of the invention there is provided a small electric motor and motor housing assembly including a small electric motor body having a pair of spaced apart sockets for receiving and frictionally engaging spaced apart parallel electrical power supply terminals; a housing supporting the motor, the housing defining an aperture over the sockets; a connector body; a pair of spaced apart parallel electrical terminals extending outwards from the connector body and receivable by the sockets; a motor body gripping portion extending from the connector body, the gripping portion mechanically latched to the motor body thereby substantially preventing relative movement between the terminals and the sockets; and a pliable member mounted between the connector body and the housing, the pliable member allowing relative movement between the connector body and the housing while the motor moves relative to the housing under varying loads.

Preferably, the assembly further includes a sealing member between the connector body and the housing. Preferably the sealing member is the pliable member. Preferably the motor body further includes an end bell and the gripping portion further comprises a pair of arms extending from the connector body, the arms resiliently displaceable away from each other to snap fit around the end bell thereby mechanically latching the connector body to the motor body. Preferably, the terminals are insert moulded. According to a second aspect of the invention there is provided a connector for a small electric motor. The motor includes a motor body with a pair of spaced apart sockets for receiving and frictionally engaging spaced apart parallel electrical power supply terminals. The connector includes: a connector body; a pair of spaced apart parallel electrical terminals extending outwards from the connector body and receivable by the sockets; and a motor body gripping portion extending from the connector body, wherein the gripping portion mechanically latches to the motor body thereby substantially preventing relative movement between the terminals and the sockets. Preferably, the motor body further comprises an end bell and the gripping portion further comprises a pair of arms extending from the connector body, the arms resiliently displaceable away from each other to snap fit around the end bell thereby mechanically latching the connector body to the motor body. Preferably, the terminals are insert moulded.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
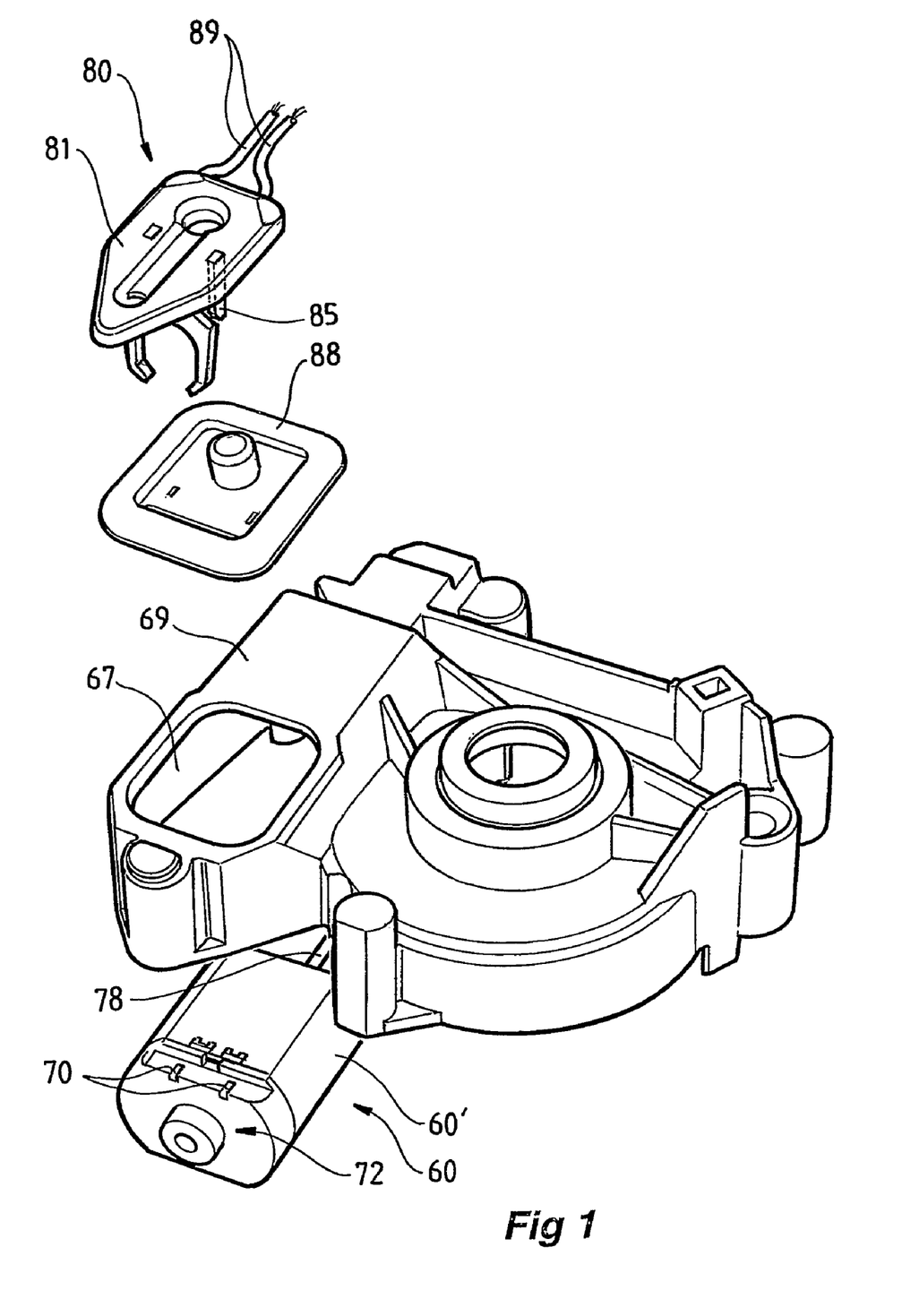
FIG. 1 shows a exploded perspective view of a small electric motor and motor housing assembly according to the invention.
Figure 2:
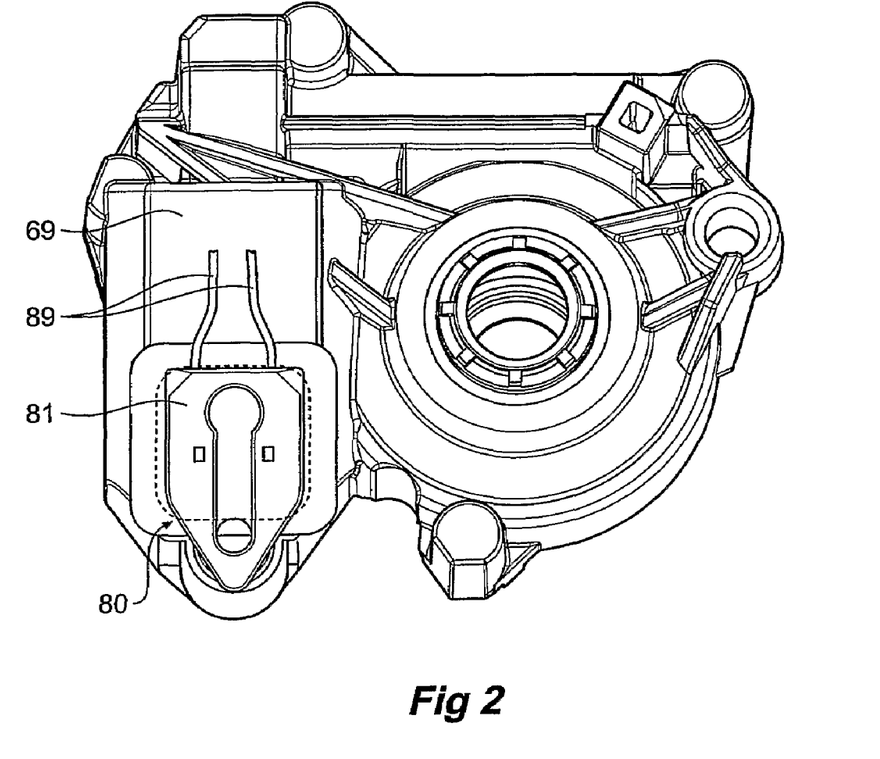
FIG. 2 shows a top perspective view of the assembly of FIG. 1.
Figure 3:
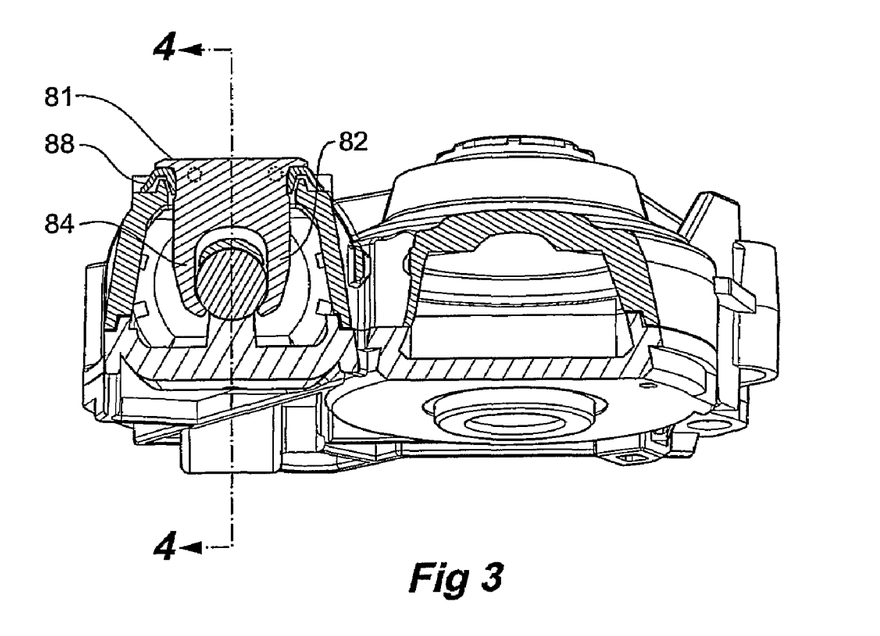
FIG. 3 is a front cut away perspective view of the assembly of FIGS. 1 and 2.

Referring to FIG. 1, a small electric motor and housing assembly is shown. The assembly includes a small electric motor 60 a moulded plastic housing 69 housing and supporting the motor 60 and a connector 80. The small electric motor has a body with a pair of spaced apart sockets 70 for receiving and frictionally engaging spaced apart parallel electrical power supply terminals 85 and 86 most clearly shown in FIG. 5. The motor body 60' has an end bell 72 and an output shaft 78.

Figure 5:
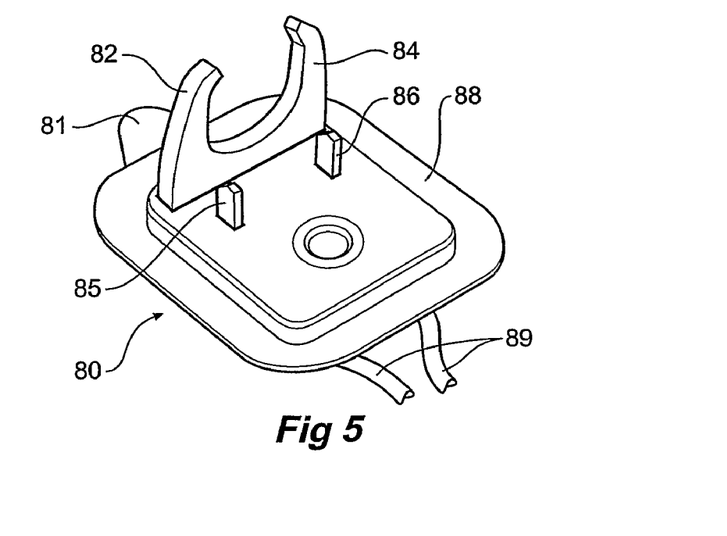
FIG. 5 is a perspective view of the connector shown in FIG. 1.

Now referring to FIG. 5 and FIG. 1, the connector 80 has a connector body 81, a pair of spaced apart parallel electrical terminals 85 and 86 extending outwards from the connector body 81 and receivable by the sockets 70 of the motor 60. The connector 80 also has a motor body gripping portion in form of a pair of arms 82 and 84 that extend from a connector body 81. The arms 82 and 84 are resiliently displaceable away from each other to snap fit around the end bell 72 of the motor 60 to thereby mechanically latch the connector body 81 to the motor body 60'.

The connector 80 includes a pliable member 88 which is mounted between the connector body 81 and the housing 69. The pliable member 88 allows relative movement between the connector body 81 and the housing 69 while the motor 60 moves relative to the housing 69 under varying loads. By having the connector 80 securely latched to the motor 60 such that the two parts move together eliminates or greatly reduces any tendency for fretting to occur in the electrical connection between the terminals 85 and 86 and their respective sockets 70 on the motor 60.

Again, referring to FIGS. 1 and 5, it can be seen that the terminals 85 and 86 are insert moulded into the connector body 81. Wires 89 protrude from the connector body 81 for electrical connection into the wiring harness of the vehicle (for instance through a plug).

The above described connector will have many applications. The housing 69 shown in FIG. 1 is designed to accommodate a gear train driven by motor 60. The gear train drives a motor vehicle external mirror head around a substantially vertical axis from an in use to a folded position.

Figure 8:
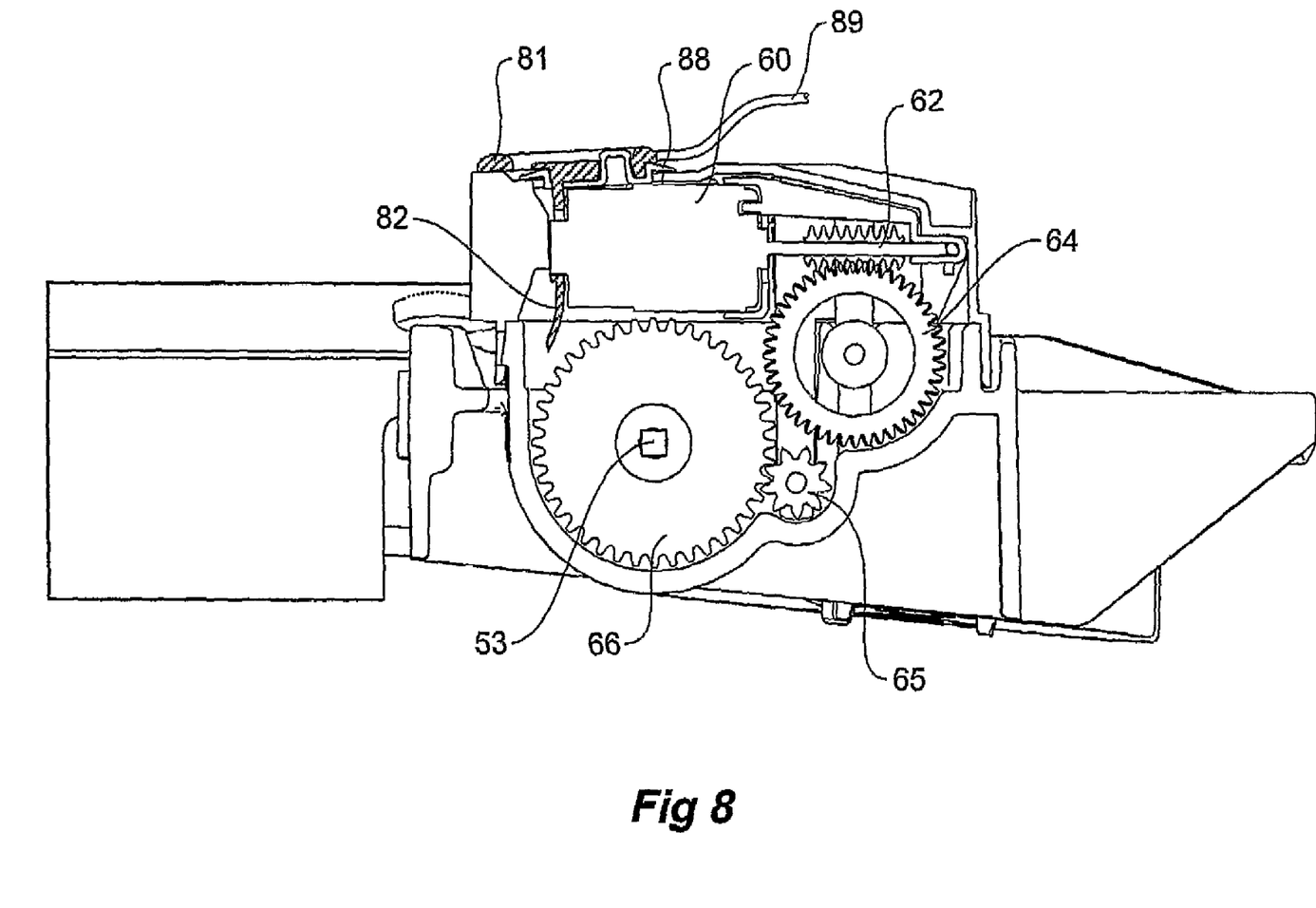
FIG. 8 is a cross-sectional view of the assembly shown in FIG. 7b.

Referring to FIGS. 2, 3, 4a and 4b, it can be seen that the motor 60 is held in place at one end at its end bell 72 and at its other end at its shaft 78 by surfaces 104 and 108 on the housing 69 on the one hand and by surfaces 106 and 110 on the base 68 on the other hand. The dimensions of the components are such that there is a small degree of float at the end of 78 and the end of the shaft 78 between the surfaces 104, 106, 108 and 110 respectively such that the motor 60 can move to allow correct meshing of the worm gear 62 with gear 64 (shown in FIG. 8) without producing excessive loads on the bearings of the gear shafts.

Figure 4A:
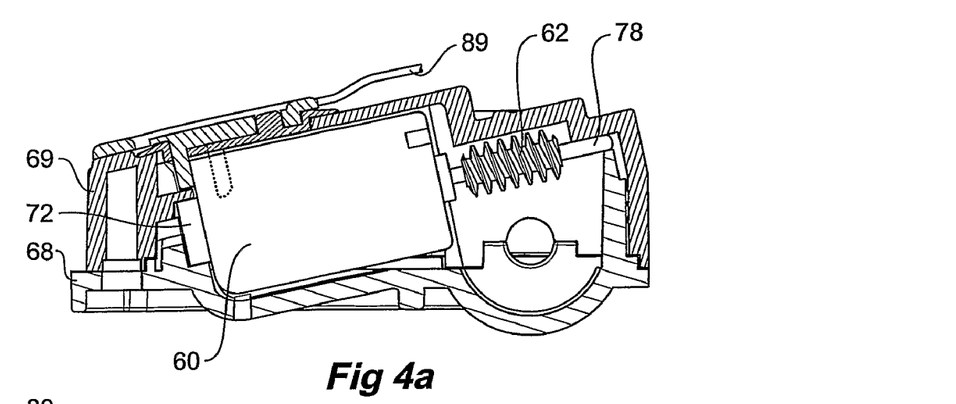
FIG. 4a is a sectional view taken through section lines 4-4 illustrated in FIG. 3.
Figure 4B:
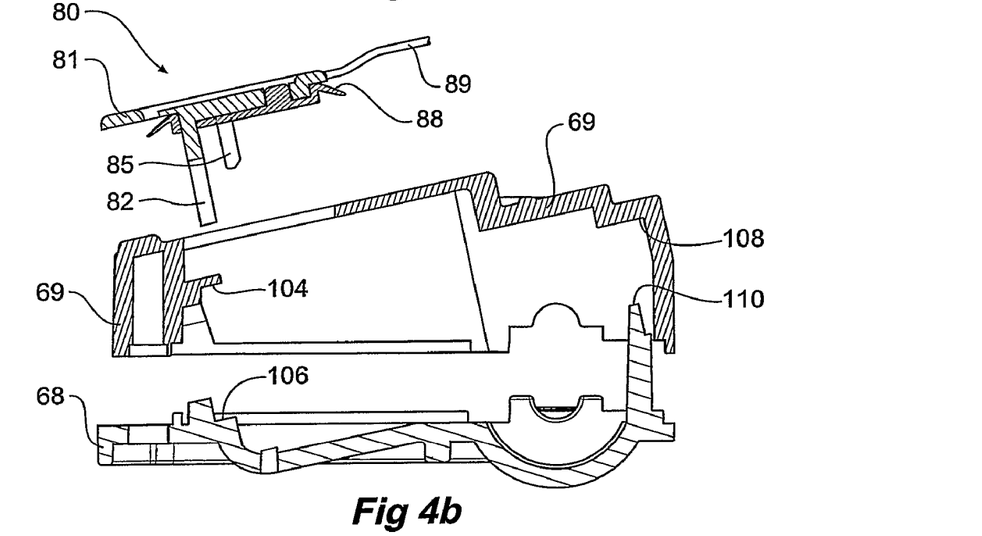
FIG. 4b is a similar view to that of FIG. 4a but with the motor not installed.

Assembly of the motor 60, housing 69 and connector 80 will now be described with reference to FIGS. 4a, 4b and FIG. 1. The motor 60 is placed within the housing 69 such that the aperture 67 is positioned over the sockets 70. The resilient arms 82 and 84 and terminals 85 and 86 are then pressed through the aperture 67 such that the arms 82 and 84 snap fit around the end bell 72 of the motor at the same time as the terminals 85 and 86 enter and frictionally engage the socket 70 of the motor 60 as is shown in FIG. 4a.

Figure 6:
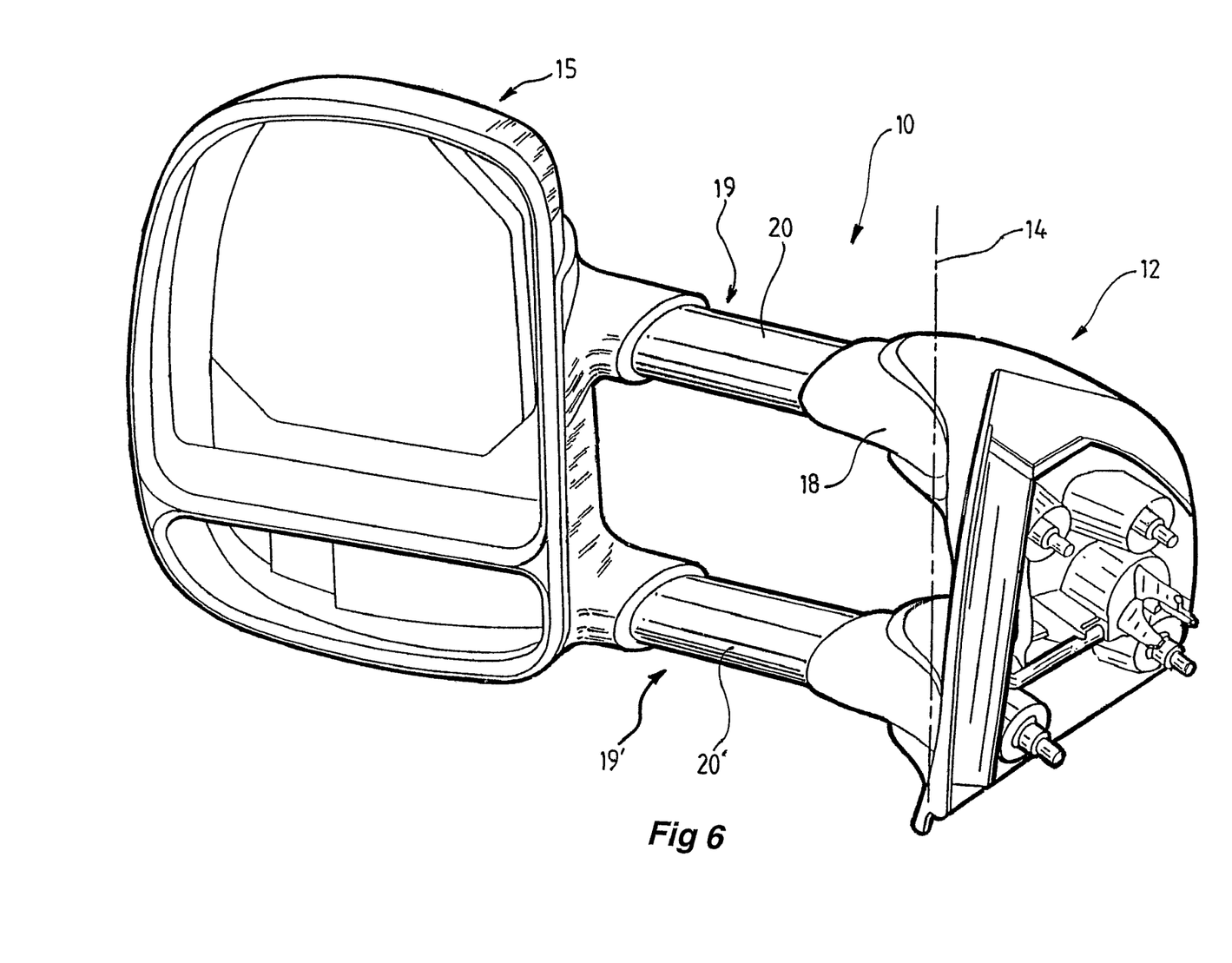
FIG. 6 is a perspective view of a general arrangement of an external rear view mirror assembly containing a small motor and a motor housing of the type showing in FIG. 1.
Figure 7A:
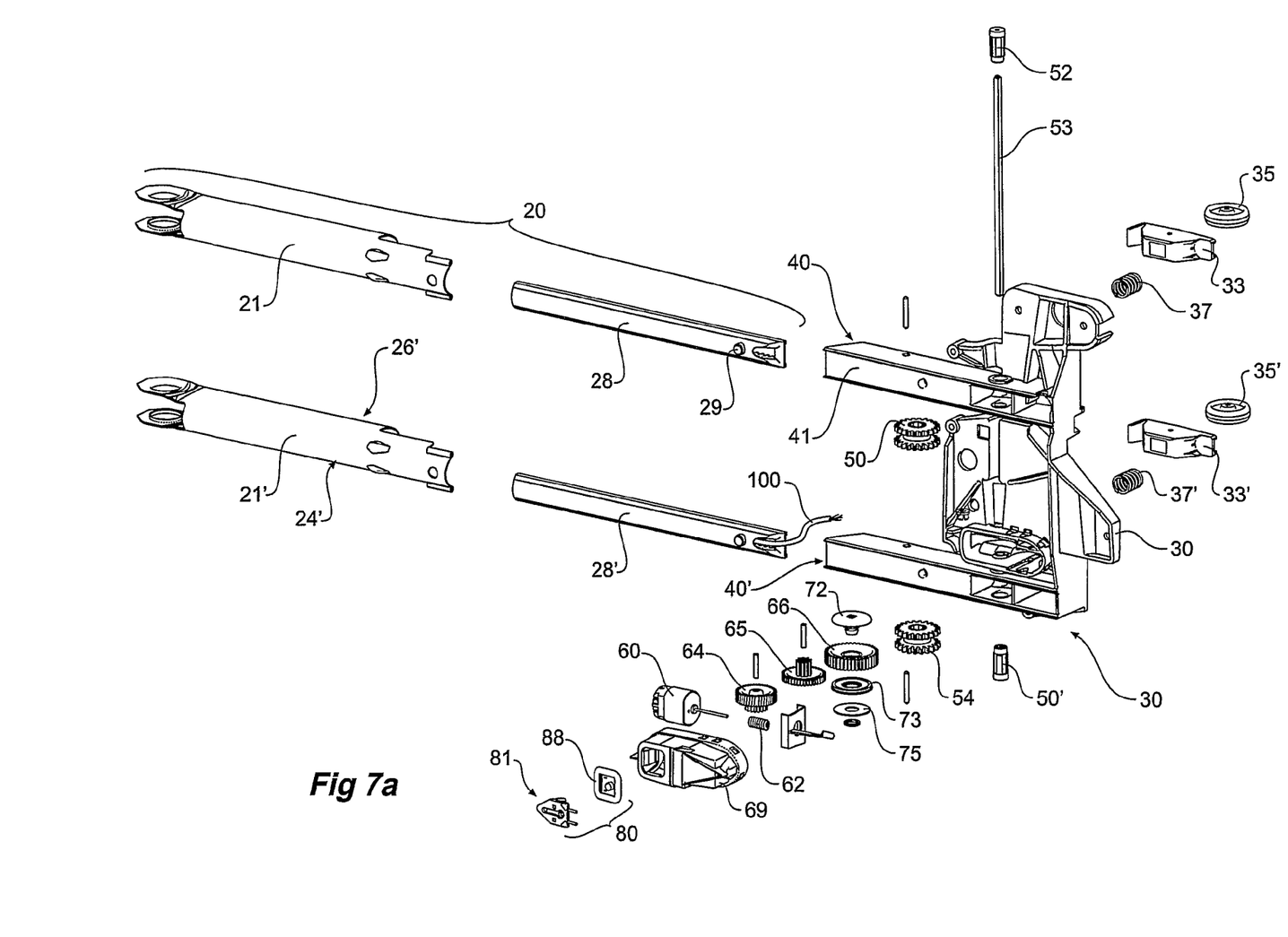
FIGS. 7a and 7b are exploded perspective views of the mirror assembly of FIG. 6.
Figure 7B:
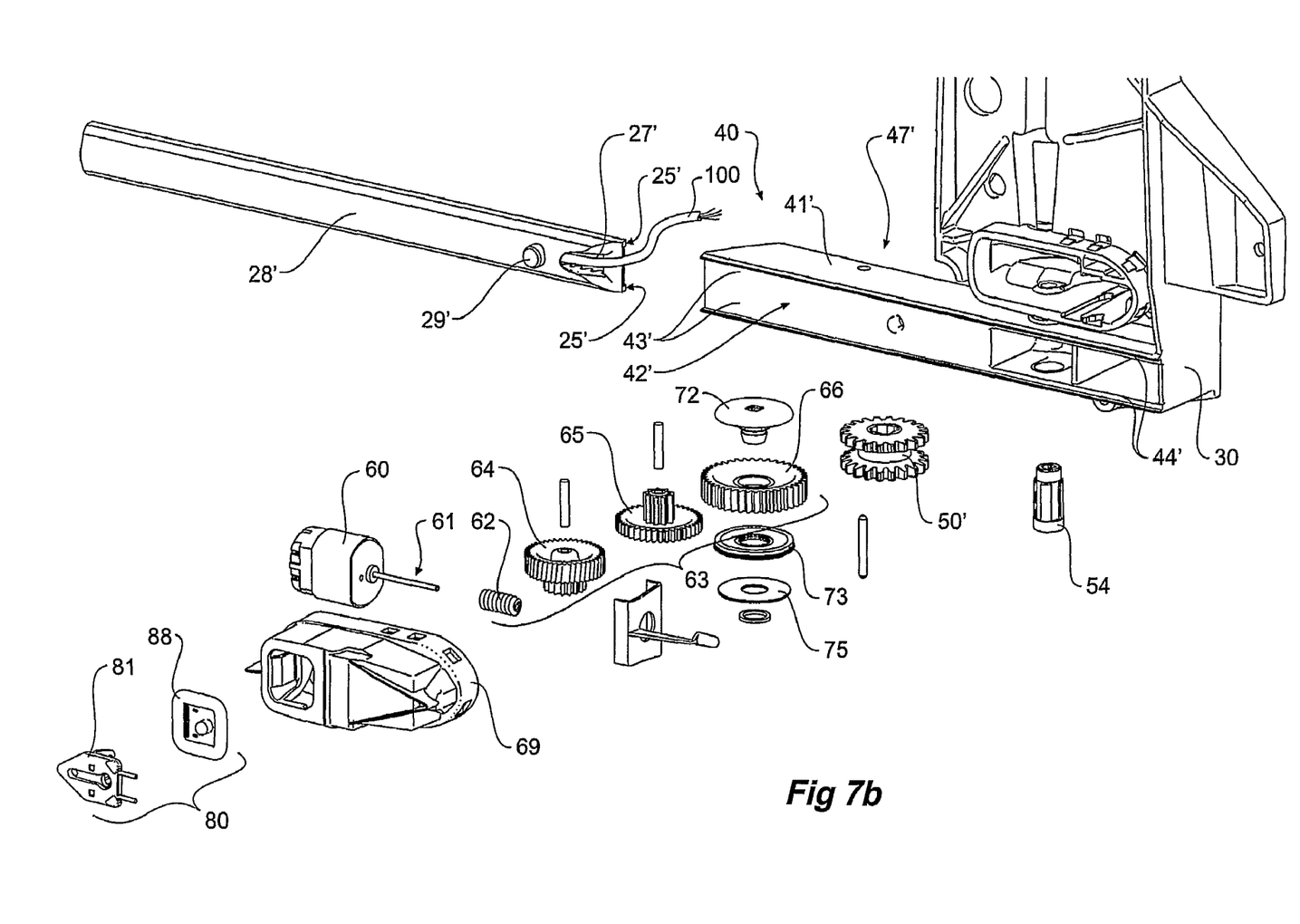

The above described connector and small electric motor housing assembly will have many applications. An application is illustrated in FIGS. 6, 7a, 7b and 8. In this application, the motor drives a gear train that extends and retracts a mirror head 15 from a bracket 12 to the side of a vehicle as shown in FIG. 6. While the motor housing 69 is shaped somewhat differently to the motor housing 69 illustrated in FIGS. 1 to 4b, the operation of the connector and its interaction with the housing 69 is the same.

Many other embodiments of the invention are possible for applications including toys, power tools and other automotive assemblies outside of vehicle mirror applications.

In the embodiments described above, the housing for the motor is moulded plastic. In other embodiments of the invention die cast metal housings may be employed.

While the present invention has been described in terms of preferred embodiments in order to facilitate better understanding of the invention, it should be appreciated that various modifications can be made without departing from the principles in the invention. Therefore, the invention should be understood to include all such modifications within the scope.

The claims defining the invention are as follows:

1. An electric motor and motor housing assembly comprising:
   an electric motor body having spaced apart sockets for receiving and frictionally engaging spaced apart electrical power supply terminals;
   a housing supporting the motor, the housing defining an aperture over the sockets;
   a connector body;
   a pair of spaced apart electrical terminals extending outwards from the connector body and receivable by the sockets;
   a motor body gripping portion including an end bell and a pair of arms extending from the connector body, the pair of arms resiliently displaceable away from each other to snap fit around the end bell thereby mechanically latching the connector body to the motor body thereby substantially preventing relative movement between the terminals and the sockets; and
   a pliable member mounted between the connector body and the housing, the pliable member allowing relative movement between the connector body and the housing while the motor moves relative to the housing under varying loads, said pliable member defining a sealing member between the connector body and the housing.

2. An electric motor and motor housing assembly as claimed in claim 1 wherein the terminals are insert molded.

* * * * *